United States Patent [19]

Nakata et al.

[11] 4,385,617
[45] May 31, 1983

[54] OVER-ROTATION PREVENTING DEVICE FOR INTERNAL COMBUSTION ENGINES

[75] Inventors: Hiroshi Nakata; Masao Iwata, both of Yokosuka, Japan

[73] Assignee: Oppama Kogyo Kabushiki Kaisha, Kanagawa, Japan

[21] Appl. No.: 193,901

[22] Filed: Oct. 6, 1980

[30] Foreign Application Priority Data

Aug. 25, 1980 [JP] Japan ................ 55/116744

[51] Int. Cl.³ .............................. F02P 1/00
[52] U.S. Cl. ..................... 123/602; 123/605; 123/334; 123/418; 123/630
[58] Field of Search ........... 123/418, 600, 602, 603, 123/605, 598, 618, 630, 334

[56] References Cited

U.S. PATENT DOCUMENTS

| | | | |
|---|---|---|---|
| 3,500,809 | 3/1970 | Hohne et al. | 123/602 |
| 3,933,139 | 1/1976 | Beeghly | 123/605 |
| 4,144,854 | 3/1979 | Katada et al. | 123/418 |
| 4,175,509 | 11/1979 | Orova et al. | 123/418 |
| 4,211,195 | 7/1980 | Zechlin | 123/602 |

FOREIGN PATENT DOCUMENTS

| | | | |
|---|---|---|---|
| 2419776 | 2/1976 | Fed. Rep. of Germany | 123/418 |
| 55-5451 | 1/1980 | Japan | 123/418 |
| 55-128666 | 10/1980 | Japan | 123/418 |

*Primary Examiner*—P. S. Lall
*Attorney, Agent, or Firm*—Murray Schaffer

[57] ABSTRACT

The present invention relates to a device wherein a positive voltage induced in an exciter coil at the time of a high speed rotation is sensed, a switching transistor is switched on by the terminal voltage of a time constant circuit connected in series with the exciter coil through the switching transistor and, in spite of a negative voltage then induced in the exciter coil, the discharge of a discharging capacitor connected in series with an ignition coil to the ignition coil is delayed by a thyristor for controlling the discharge in response to the above mentioned time constant characteristic to delay the ignition speed, that is, to positively prevent the over-rotation of the internal combustion engine.

6 Claims, 7 Drawing Figures

OVER-ROTATION PREVENTING DEVICE FOR INTERNAL COMBUSTION ENGINES

BACKGROUND OF THE INVENTION

This invention relates to over-rotation preventing devices for internal combustion engines and more particularly to a device for delaying the operation of a thyristor controlling the feed of an electric current to an ignition coil with a C.R. (capacitor-resistance) time constant circuit to thereby delay the ignition timing of an internal combustion engine.

There has been already provided a device for preventing the over-rotation of internal combustion engines with a governor mechanism. However, such governor mechanism rotates integrally with a crank shaft, operates to extend and contract and therefore has problems in that it requires a large mounting space, has a difficult to fit and is short mechanical life. On the other hand, there have been provided various electrical control circuits made to delay the timing of an ignition circuit. However, they are limited in the angle delaying method, can not positively prevent the over-rotation of internal combustion engines and have problems in that electric noises from these over-rotation preventing circuit influence the ignition circuit and disturb the normal ignition timing.

SUMMARY OF THE INVENTION

The present invention is made in view of such conventional problems and has it as an object the provision of an over-rotation preventing device for internal combustion engines wherein a positive voltage induced in an exciter coil at the time of a high speed rotation is sensed, a switching transistor is switched on by the terminal voltage of a time constant circuit connected in series with the exciter coil through the switching transistor and, in spite of a negative voltage then induced in the exciter coil, the discharge of a discharging capacitor connected in series with an ignition coil to the ignition coil is delayed by a thyristor for controlling the discharge in response to the above mentioned time constant characteristic to delay the ignition speed, that is, to positively prevent the over-rotation of the internal combustion engine.

The above mentioned and other objects, features and advantages of the present invention will become clear from the following detailed explanation relating to an embodiment shown in the accompanying drawings.

DESCRIPTION OF THE INVENTION

Figure 1:
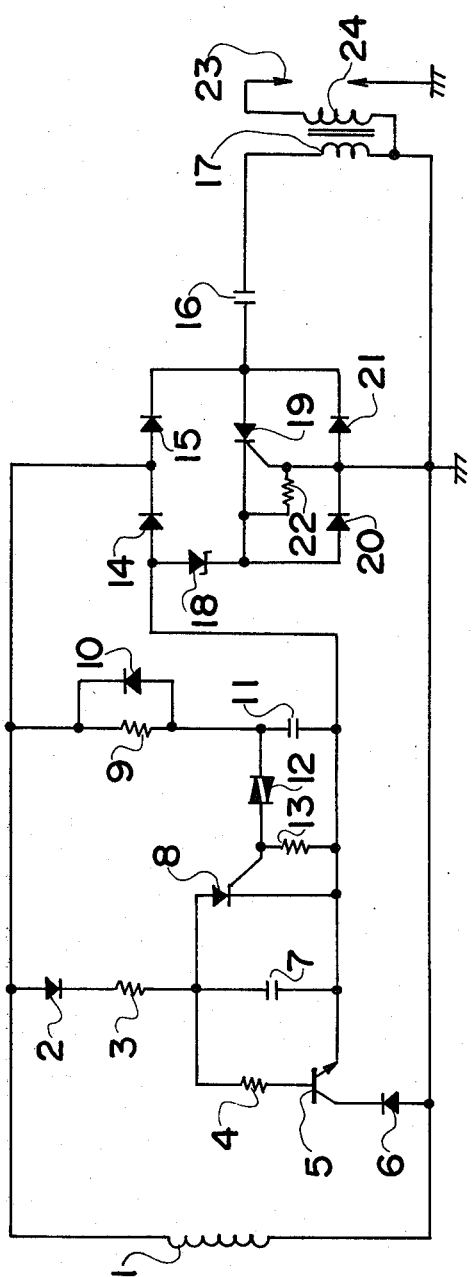
FIG. 1 is a circuit diagram showing an over-rotation preventing device for an internal combustion engine according to the present invention.

In FIG. 1, an exciter coil is provided near a rotatable flywheel (not shown) having a permanent magnet embedded in it. A diode 2, resistance 3, time constant circuit resistance 4, base and collector of a switching transistor 5 and diode 6 are connected in series with the exciter coil. These series circuits form a later described negative voltage bypass circuit. Further, a time constant circuit capacitor 7 and anode and cathode of a thyristor 8 are connected respectively in parallel between the connecting neutral point of the above mentioned resistances 3 and 4 and the emitter of the switching transistor 5. A parallel circuit of a capacitor 9 and reverse direction diode and a rotation speed detecting capacitor 11 are connected in series between the anode side of the above mentioned diode 2 and the emitter of the switching transistor 5 and a diac 12 is connected between the connecting neutral point of the parallel circuit and capacitor 11 and the gate of the already described thyristor 8. Reference numeral 13 denotes a bias resistance connected between the connecting neutral point of the above mentioned gate of the thyristor 8 and diac 12 and the above mentioned emitter. Further, a reverse direction diode 14 is connected between the anode side of the above mentioned diode 2 and the emitter of the switching transistor 5 and the primary winding 17 of an ignition coil is connected at one end to the cathode side of the reverse direction diode 14 through a normal direction diode 15 and discharging capacitor 16. The anode side of the above mentioned reverse direction diode 14 is connected to the positive potential side of the above mentioned capacitor 16 in the normal direction through a Zener diode 18 and reverse direction controlling thyristor 19. The gate of this thyristor 19 is connected to the anode side of the above mentioned diode 6. A diode 20 is connected between this gate and the connecting neutral point of the cathode of the Zener diode 18 and cathode of the thyristor 19 and a diode 21 is connected between the gate of the thyristor 20 and anode of the thyristor 19. Reference numeral 22 denotes a potential difference setting resistance connected between the cathode and gate of the thyristor 19. Reference numeral 23 denotes a spark plug connected to the secondary winding 24 of the ignition coil.

The operation of the above mentioned circuit is explained by the following.

Figure 2:
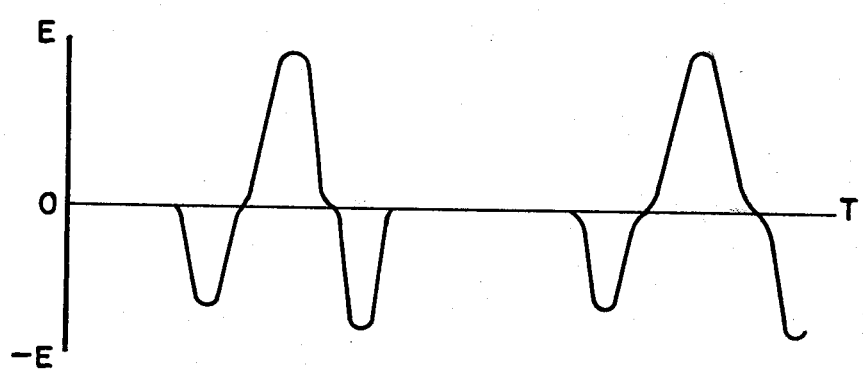
FIG. 2 is a voltage wave form diagram of an exciter coil.
Figure 3:
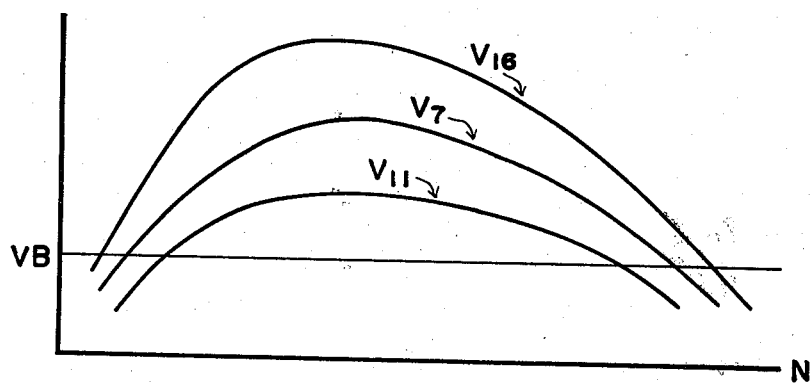
FIG. 3 is a terminal voltage characteristic diagram of a charging and discharging capacitor for the number of revolutions of the engine.

First, such voltage wave form as is shown in FIG. 2 is put out at both ends of the above mentioned exciter coil 1, adjacent to the crank shaft of the flywheel provided with the permanent magnet embedded in it, by the rotation by the crank shaft. This voltage is put in a positive half cycle into the capacitors 7, 11 and 16 connected in series respectively with the diode 2, resistance 9 and diode 15 through them. By the way, these charged voltages take such values as $V_{16}$, $V_7$ and $V_{11}$ in the forms of parabolas as are shown in FIG. 3.

Figure 4:
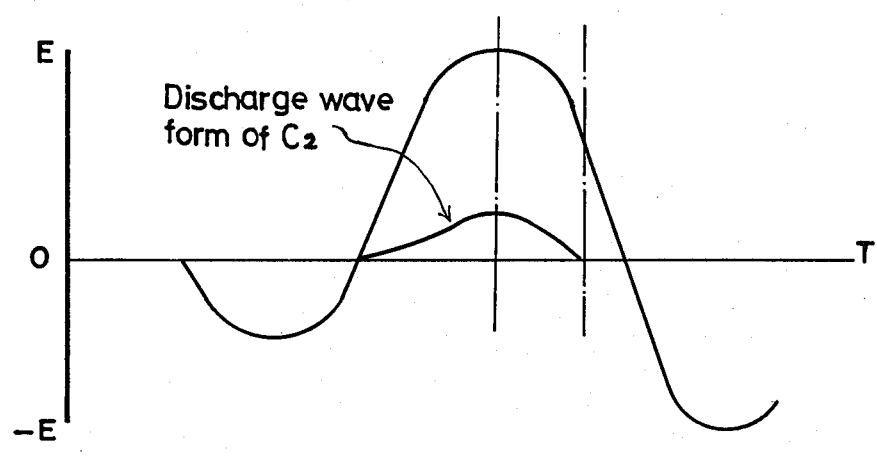
FIG. 4 is a discharge characteristic diagram of a time constant circuit capacitor at the time of a low speed rotation of the engine.

In case the rotation of the above mentioned engine does not rise well and is low, the terminal voltage $V_{11}$ charged through the resistance 9 will not reach a value sufficient to break over the above mentioned diac 12, therefore the thyristor 8 connected in the gate to this diac 12 will not be triggered and will remain nonconductive and the capacitor 7 will not be shunted. Therefore, the charged voltage $V_7$ of this capacitor 7 will be added to the resistance 4 set in parallel with the capacitor 7 and will trigger the base of the switching transistor 5 to conduct. When the discharge time constant determined by the respective values of the above mentioned resistance 4 and capacitor 7 is set to be shorter than the positive half cycle of the above mentioned voltage wave form, as shown in FIG. 4, in the low speed rotation range of the engine, the switching transistor 5 will be able to be switched off before the following negative half cycle voltage is generated. That is to say, the triggering of the above mentioned thyristor 19 can be prevented. Thus, with the negative half cycle voltage, the circuit connecting the diode 14, Zener diode 18, resistance 22 and gate of the thyristor 19 will conduct and, by the resistance 22, a potential difference will be produced between the gate and cathode of the thyristor 19 and this thyristor 19 will conduct. Thus, the electric charge accumulated in the capacitor 16 will be made to flow to the primary winding 17 of the ignition coil through the diode 20 and thyristor 19 and a high voltage will be induced in the secondary winding 24. Therefore, a spark large enough will be obtained at the spark plug 23.

The case where the rotation of the engine is at a substantially medium speed shall be described in the following. When the number of revolutions of the engine rises to a substantially medium speed, the voltage induced in the exciter coil 1 will also rise and the voltage with which the above mentioned capacitor 11 is charged will also rise. When this voltage reaches and exceeds the breakover voltage $V_B$ of the diac 12, the thyristor 8 will be triggered through this diac. Thus the electric charge of the capacitor 7 will be discharged through this thyristor 8, therefore the base potential of the transistor 5 will reduce and the transistor 5 will not operate. Therefore, when a negative half cycle voltage appears, the same as is mentioned above, the thyristor 19 will be triggered, the electric charge of the capacitor 16 will be discharged to the primary coil 17 of the ignition coil and a normal high voltage will be able to be obtained in the secondary winding 24 at a normal ignition timing.

Figure 5:
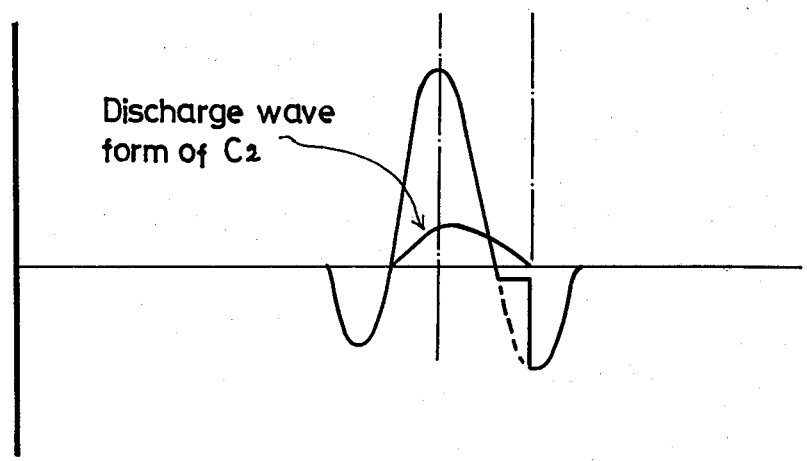
FIG. 5 is a delay angle controlling wave form diagram produced by the above mentioned discharge at the time of a high speed rotation of the same engine.
Figure 6:
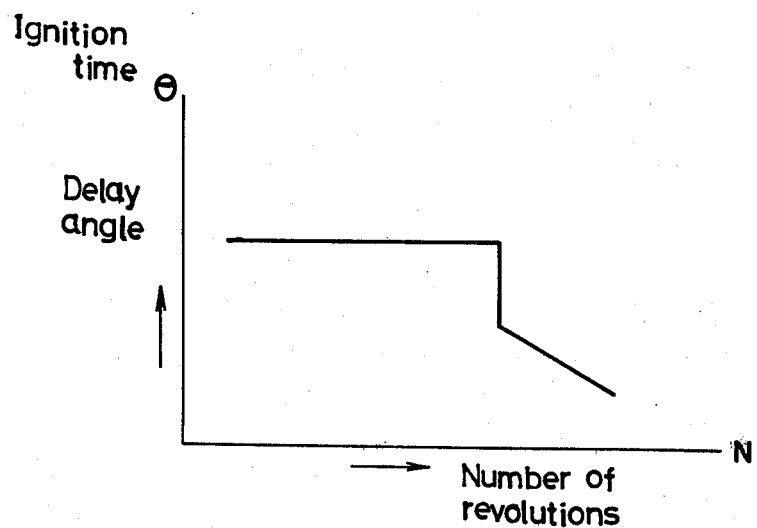
FIGS. 6 and 7 are delay angle controlling characteristic diagrams.
Figure 7:
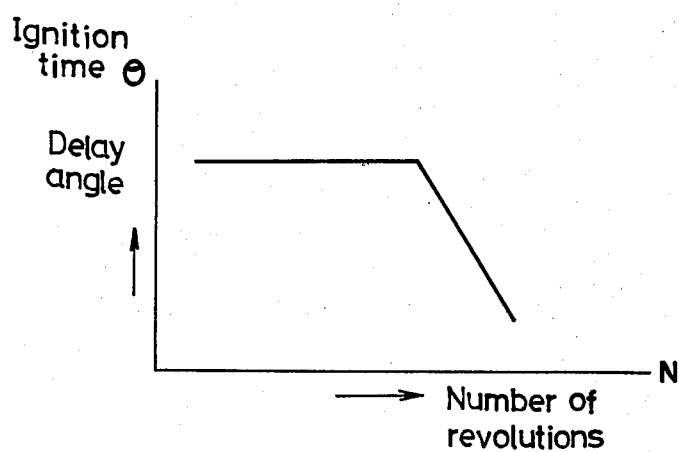

Finally, the case where the engine enters a high speed rotation or over-rotation range is be described. In such case, the voltage $V_{11}$ with which the capacitor 11 is charged will be below the break-over voltage of the diac 12 as shown in FIG. 3 and therefore the thyristor 8 will not be able to be triggered. Therefore, the electric charge with which the above mentioned capacitor 7 is charged will be discharged through the resistance 4 by the discharge time constant determined by the capacitor 7 and resistance 4 and the switching transistor 5 will be operated by this voltage. At the time of this operation, the output voltage wave form of the exciter coil 1 will be higher in the frequency than at the time of a low speed and therefore the discharge time of the capacitor 7 will exceed the negative half cycle of the above mentioned wave form as shown in FIG. 5. Thus, even if the negative voltage is put into the gate of the above mentioned thyristor 19, while the switching transistor 5 is operating, the negative voltage will bypass this switching transistor 5, therefore the thyristor 19 will not be triggered and meanwhile the discharge of the above mentioned discharging capacitor will be delayed. Thus, the generation of a spark at the spark plug 23 will be delayed. That is to say, in such case, when the voltage of the capacitor 11 becomes to be below the break-over voltage of the diac 12, the discharge time of the capacitor 7 will have extended to the time of the output voltage, will be therefore delayed at once by the delay angle width corresponding to the charge amount of the capacitor and, as shown in FIG. 6, the ignition time will be quickly delayed in the angle from the predetermined number of revolutions of the engine. Further, when the time constants of the above mentioned capacitor $C_2$ and resistance $R_2$ are freely selected or other time constants are added to them, such delay angle operation characteristic as is shown in FIG. 7 will be able to be obtained in proportion to the voltage exceeding the delay angle width of the above mentioned capacitor 11.

Thus, in the over-rotation preventing device of the present invention, the ignition timing of the spark plug 23 can be delayed in the angle over its time constant width by the discharge time constant of the capacitor 7 in the over-rotation range of the engine, therefore the rotation speed of the internal combustion engine can be stabilized and the breakdown, shaft break or seizure of the engine by the over-rotation can be prevented.

As explained above, according to the present invention, a positive voltage induced in an exciter coil at the time of an over-rotation is sensed, a switching transistor is switched on by the charged voltage of a time constant circuit connected in series with the exciter coil through the switching transistor and, in spite of a negative voltage then induced in the exciter coil, the ignition of a spark plug by the discharge of a discharging capacitor connected to an ignition coil is delayed by the above mentioned time constant characteristic so that the over-rotation of the internal combustion engine can be positively prevented at a rate corresponding to the rotation speed and the entire device can be compacted.

Further, by the selection of a C.R. time constant circuit determining the above mentioned time constant characteristic, the delay angle for the number of revolutions of the engine can be variously selected and a delay angle operation characteristic corresponding to the kind of the engine can be obtained.

What I claim is:

1. An over-rotation preventing circuit for internal combustion engines having an ignition coil, comprising an exciter coil 1 for inducing a voltage corresponding to the number of revolutions of the engine, and a discharging capacitor connected to said ignition coil, a first capacitor 11 charged by the induced voltage, a switching circuit switched by the charged voltage of said first capacitor 11, a time constant circuit including a second capacitor 7 charged and discharged by said switching circuit, a switching transistor 5 responsive to a predetermined discharge time constant of said time constant circuit and a first thyristor 19 responsive to the negative half cycle of said induced voltage to feed a high voltage to the primary winding 17 of the ignition coil via said discharging capacitor 16 when said switching transistor 5 is not operating, said switching transistor 5 being connected by its collector to ground and by its emitter to the gate of said first thyristor such that, at the time of the over-rotation of the engine, in the negative half cycle of the voltage fed to the exciter coil 1, the negative voltage is grounded and the thyristor is delayed by the discharge time of said second capacitor.

2. An over-rotation preventing device for internal combustion engines according to claim 1 wherein the switching circuit includes a diac 12 connected to said first capacitor 11 so that when the terminal voltage of the first capacitor 11 exceeds the breakover voltage of a diac connected to it, said switching circuit operates to trigger a second thyristor 8 connected in parallel with the second capacitor 7 of said time constant circuit.

3. An over-rotation preventing device for internal combustion engines according to claim 2 wherein said diac is connected between said first capacitor 11 and the gate of the second thyristor 8.

4. An over-rotation preventing circuit for internal combustion engines having an ignition coil, comprising an exciter coil 1 for inducing a voltage corresponding to the number of revolutions of the engine, and a discharging capacitor connected to said ignition coil, a first capacitor 11 charged by the induced voltage, a switching circuit switched by the charged voltage of said first capacitor 11, a time constant circuit including a parallel connection of a second capacitor 7 charged and discharged by said switching circuit and a resistor, a switching transistor 5, the base of which is connected to the resistor responsive to a predetermined discharge time constant of said time constant circuit and a first thyristor 19 responsive to the negative half cycle of said induced voltage to feed a high voltage to the primary winding 17 of the ignition coil via said discharging capacitor 16 when said switching transistor 5 is not operating, said switching transistor 5 being such that, at the time of the over-rotation of the engine, in the negative half cycle of the voltage fed to the exciter coil 1, the negative voltage is grounded and the thyristor is delayed by the discharge time of said second capacitor.

5. An over-rotation preventing device for internal combustion engines according to claim 4, wherein the switching circuit includes a diac 12 connected to said first capacitor 11 so that when the terminal voltage of the first capacitor 11 exceeds the breakover voltage of a diac connected to it, said switching circuit operates to trigger a second thyristor 8 connected in parallel with the second capacitor 7 of said time constant circuit.

6. An over-rotation preventing device for internal combustion engines according to claim 5, wherein said diac is connected between said first capacitor 11 and the gate to the second thyristor.

* * * * *